United States Patent [19]

Shay et al.

[11] Patent Number: 5,191,051
[45] Date of Patent: Mar. 2, 1993

[54] PROPOXYLATED ALKALI-SOLUBLE THICKENERS

[75] Inventors: Gregory D. Shay; Fran K. Kravitz, both of Des Plaines, Ill.

[73] Assignee: Union Carbide Chemicals & Plastics Technology Corporation, Danbury, Conn.

[21] Appl. No.: 590,531

[22] Filed: Sep. 28, 1990

Related U.S. Application Data

[63] Continuation of Ser. No. 294,405, Jan. 9, 1989, abandoned.

[51] Int. Cl.$^5$ ............................................ C08F 226/02
[52] U.S. Cl. .................................................... 526/301
[58] Field of Search .......................................... 526/301

[56] References Cited

U.S. PATENT DOCUMENTS 4,514,552  4/1985  Shay et al. ............................ 526/301
4,600,761  7/1986  Ruffner et al. ........................ 526/270

Primary Examiner—Joseph L. Schofer
Assistant Examiner—Alex H. Walker
Attorney, Agent, or Firm—S. H. Hegedus

[57] ABSTRACT

There is disclosed an aqueous emulsion copolymer which provides an alkali-soluble anionic copolymer providing antisettling and antisag thickening characteristics especially useful in textured latex paints. The copolymers comprise an aqueous emulsion copolymer of:

(A) about 10–60 weight percent of an alpha, beta-monoethylenically unsaturated carboxylic acid;

(B) about 20–80 weight percent of a non-reactive monoethylenically unsaturated monomer which provides a water-insoluble copolymer;

(C) about 0.5–40 weight percent of a monoethylenically saturated, hydrophobic nonionic monomer which is the reaction product of a monohydric or monoamine-terminated polypropoxylated or polybutoxylated hydrophobe with a monoethylenically unsaturated monomer having a single group which is reactive under the conditions employed; and (D) from 0 up to about 2 weight percent of a polyethylenically unsaturated monomer.

17 Claims, No Drawings

PROPOXYLATED ALKALI-SOLUBLE THICKENERS

This application is a continuation, of application Ser. No. 07/294,405, filed Jan. 9, 1989 now abandoned.

DESCRIPTION

TECHNICAL FIELD

This invention relates to the production of alkali-soluble aqueous emulsion copolymer thickeners in which the emulsion copolymer is a copolymer of monoethylenically unsaturated monomers comprising a large proportion of carboxyl-functional monomer and a nonionic polypropoxylated or polybutoxylated monoethylenically unsaturated monomer. The presence of a nonionic polypropoxylated or polybutoxylated unsaturated monomer in the alkali-soluble emulsion copolymers under consideration provides very different thickening characteristics compared with similar copolymers containing polyethoxylated monomer. More particularly, when the unsaturated nonionic monomer has ordinary surfactant properties because of the presence therein of a significant proportions of hydrophilic ethoxy groups, the copolymer has very different thickener properties than the new copolymers which lack surfactant character. These new copolymer thickeners provide improved anti-settling and improved sag resistance properties and can be used to provide textures aqueous latex paints.

BACKGROUND ART

Water-insoluble aqueous emulsion copolymers of monoethylenically unsaturated monomers including a significant proportion of copolymerized carboxyl-functional monomer so that they swell or dissolve in water upon the addition of alkaline material are known. These copolymerized monomers produce anionic copolymer thickeners useful in ordinary aqueous latex paints because of the presence in the copolymer of large amounts of copolymerized carboxyl-functional monomer together with copolymerized monomer having surfactant character. This is taught in U.S. Pat. No. 4,384,096 issued May 17, 1983 which uses an acrylate ester monomer as the surfactant monomer. This is also taught using a urethane monomer as the surfactant monomer to obtain a better balance of low shear and high shear properties in G. D. Shay, E. Eldridge and J. E. Kail U.S. Pat. No. 4,514,552 issued to the assignee of this application on Apr. 30, 1985.

In this U.S. Pat. No. 4,514,552, the surfactant monomer is provided by the reaction product of a monoethylenically unsaturated monoisocyanate with a monohydric surfactant which is normally a polyethoxylated hydrophobe, as is conventional in the surfactant art. The polyethoxylation is usually carried out using ethylene oxide, but surfactants can also be made when a portion of the ethylene oxide is replaced by propylene oxide, and this is also disclosed in U.S. Pat. No. 4,514,552. However, when the ethylene oxide is completely replaced by propylene oxide, butylene oxide, or a mixture thereof, the conventional surfactant characteristics are no longer present because the monomers are entirely hydrophobic.

The alkali-soluble aqueous emulsion copolymers disclosed in U.S. Pat. No. 4,514,552 are especially useful in providing thickeners for ordinary aqueous latex paints having the previously noted better balance of low shear and high shear properties, and this is especially important in semi-gloss paints and gloss paints. However, when the ethylene oxide is completely replaced by propylene oxide, butylene oxide, or a mixture thereof, the products are no longer useful in ordinary aqueous latex paints to provide desirable viscosity characteristics for leveling and brush drag since they do not provide useful rheology for such purpose. As discovered in the present invention, use of a polypropoxylated and/or polybutoxylated nonionic monomer unexpectedly provides improved anti-settling and improved anti-sag properties.

More particularly, preferred emulsion copolymers in accordance with U.S. Pat. No. 4,514,552 contain 30% ethyl acrylate, 35% methacrylic acid and 35% of urethane-based surfactant monomer in which the surfactant portion of the molecule is a polyethoxylated monohydric hydrophobe, such as an octyl or nonyl phenol. These thickeners provide a reasonably good balance of low shear viscosity needed for leveling and high shear viscosity needed for brush drag when incorporated into aqueous latex paints which are alkaline to dissolve the copolymer. While these viscosities are reasonably good, the low shear viscosity is still too low and the high shear viscosity is still too high, and efforts have been made to correct this. On the other hand, typical emulsion copolymers contemplated by the invention discussed herein provide low shear viscosities which are still lower and high shear viscosities which are still higher than those obtained in the patent under consideration, and this makes these products far less useful in ordinary latex paints for the purpose of adjusting these viscosities.

On the other hand, there are several utilities for the thickeners of this invention described hereinafter in which thickening characteristics very different from those needed in ordinary latex paints are essential. To illustrate these, anti-settling characteristics are important in aqueous agricultural emulsions and dispersions, as well as in aqueous cosmetic compositions and aqueous oil field drilling compositions.

Even some paints require unusual rheological characteristics, such as textured paints which are applied with a large napped roller so as to deposit a configured layer. It is desired to retain this configuration as the paint dries, and this is the opposite of the usually desired flow which eliminates brush marks and roller marks.

In addition, some conventional paints have too much brush drag (i.e., are hard to apply) and/or too much leveling which causes sagging. The thickeners of this invention can be added in a minor proportion of total thickener to correct the rheology and also provide improved anti-settling and anti-sag properties.

SUMMARY OF THE INVENTION

In this invention, an aqueous emulsion copolymer is formed which provides an alkali-soluble anionic copolymer having very different thickening characteristics from those described in U.S. Pat. No. 4,514,552. This aqueous emulsion copolymer contains: (A) about 10–60 weight percent of an alpha, beta-monoethylenically unsaturated carboxylic acid, typically methacrylic acid; (B) about 20–80 weight percent of a non-reactive monoethylenically unsaturated monomer which provides a water-insoluble copolymer, typically ethyl acrylate; (C) about 0.5–40 weight percent of a monoethylenically unsaturated, hydrophobic nonionic monomer (a macromonomer) which is the reaction product of a monohydric or monoamine-terminated polypropoxylated or polybutoxylated hydrophobe with a monoethylenically unsaturated monomer having a single group which is reactive with the terminal monohydric or monoamine group under the conditions employed, such as an unsaturated monoisocyanate or an unsaturated monoanhydride; and (D) from 0 up to about 2 weight percent of a polyethylenically unsaturated monomer.

The aqueous emulsion copolymers used herein preferably contain: (A) about 20–50 weight percent of the alpha, beta-monoethylenically unsaturated carboxylic acid; (B) about 30–70 weight percent of the non-reactive monoethylenically unsaturated monomer which provides a water-insoluble copolymer; (C) about 5–30 weight percent of the previously described nonionic monomer; and (D) from 0 up to about 2 weight percent of a polyethylenically unsaturated monomer.

The resulting copolymer is seemingly similar to what was described in the prior art referred to previously. However, in this invention, we replace the polyethoxylated monomer having surfactant characteristic with a polypropoxylated or polybutoxylated monomer which lacks surfactant characteristics. The result is an aqueous emulsion copolymer having very different characteristics.

The emulsion copolymerization can be carried out in the presence of a small proportion, from 0.1 to 3 weight percent, of a vinyl aromatic sulfonate salt with an alkali metal, such as sodium styrene sulfonate, since this eases the grit and plating difficulties encountered during copolymerization. But these difficulties can be tolerated, so while the presence of the sulfonate monomer is helpful, it is not essential.

It is also permissible to carry out the polymerization in the presence of a chain terminating agent in an amount of from 0.05% to 0.5%, based on the total weight of monomers subjected to copolymerization, but this is entirely optional and the chain terminating agent is normally not present in a copolymer of this invention. Appropriate chain terminating agents are themselves well known, and are typically organic mercaptans illustrated by dodecyl mercaptan.

DETAILED DESCRIPTION OF THE INVENTION

Referring first to the components of the described thickening copolymers, any copolymerizable alpha, beta-monoethylenically unsaturated carboxylic acid can be used. These are usually either acrylic acid or methacrylic acid, preferably the latter.

The non-reactive monoethylenically unsaturated monomer is free of reactive groups other than the single unsaturated group and is subject to wide variation so long as its use provides a water insoluble copolymer. These are usually $C_1$ to $C_8$ alkyl esters of (meth)acrylic acid which indicates that the acid can be either acrylic acid or methacrylic acid. Ethyl acrylate is particularly desirable. Other illustrative monomers providing the component of the copolymer which provides water insolubility are butyl acrylate, 2-ethylhexyl acrylate, methyl methacrylate, vinyl acetate, styrene, vinyl toluene, and the like.

The nonionic hydrophobic monomers (macromonomers) which can be used are similar to those which are known, as disclosed in U.S. Pat. No. 4,514,552 discussed hereinbefore, except for the change from containing a substantial portion of ethoxylation which changes the character of the thickener which is formed, as has been explained. It is preferred to employ a urethane monomer which includes styryl unsaturation. The preferred urethane monomers lacking surfactant characteristics are derived from monohydric nonionic hydrophobes having the formula:

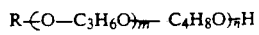

$$R-(O-C_3H_6O)_m-(C_4H_8O)_nH$$

in which R is an alkyl group containing 1–22 carbon atoms (typically dodecyl) or an alkaryl group containing 6–22 carbon atoms (typically octyl phenol), n is a number having an average value of 0–150, and m is a number having an average value of 0–150 and $n+m=6-150$, preferably about 10–60.

The preferred urethane monomers are thus the urethane reaction product of the defined monohydric nonionic hydrophobic polyalkoxylates with a monoethylenically unsaturated monomer as previously defined. The terminal group to which the nonionic alkoxylate is attached is usually an aliphatic alcohol or alkyl phenol in which a carbon chain containing at least 1 carbon atom provides the terminal group. It is not necessary that the terminal group be strongly hydrophobic because the entire molecule is hydrophobic. The useful compounds are illustrated by propylene oxide adducts of dodecyl alcohol or octyl or nonyl phenol which contain about 6 to about 150, preferably 10 to 60 moles of propylene oxide per mole of hydrophobe.

It will be understood that the polypropoxylated products provided by reaction with the usual propylene oxide are poly-iso-propoxylated, and the polybutoxylated products provided by reaction with the usual butylene oxide are poly-sec-butoxylated, and these are preferred herein because they are more available. However, straight chain products are also available and can be used.

Unsaturated monoethylenic reactive monomers with which the above nonionic polyalkoxylates are reacted to form the nonionic macromonomers are illustrated by maleic anhydride and monoethylenic monoisocyanates. The monoisocyanate, is preferably an alpha, alpha-dimethyl-m-isopropenyl benzyl isocyanate (available as m-TMI from American Cyanamid). Maleic anhydride is also easily reactive with the monohydric polyalkoxylate producing a carboxyl-functional ester therewith. While ethers with monohydric vinyl ethers, like butanediol monovinyl ether, and esters with monocarboxylic acids, like methacrylic acid, are useful, they are harder to produce without premature polymerization, and hence are not preferred. Maleic anhydride has the advantage of low cost which is always helpful.

While monohydric-terminated nonionic hydrophobes are preferably used, amine-terminated nonionic hydrophobes having the same structure are also available and can be used. When these amine-terminated nonionic hydrophobes are reacted with an unsaturated monoisocyanate, a urea group is formed, and when they are reacted with an unsaturated anhydride, an amide or imide group is formed.

Polyethylenic monomers which may be used in small amounts, but which are preferably absent, are illustrated by hexanediol diacrylate, hexane diol dimethacrylate, and the dimaleate of monobutyl maleate with glycerin.

While it is optional, best results are obtained when a small proportion of a salt of a monoethylenically unsaturated aromatic sulfonic acid is also present during the copolymerization. These are preferably a sodium salt, such as sodium styrene sulfonate, albeit other monovalent bases, like potassium, ammonium or a volatile amine, like diethanol amine, can be used in place of sodium. Sodium styrene sulfonate is preferred, but sodium vinyl toluene sulfonate is also useful.

The sodium styrene sulfonate, or the like, can be simply incorporated into the monomer mixture which is copolymerized, or it can be incorporated into the aqueous precharge to which the bulk of the monomers being copolymerized is slowly added. The proportion of this component needed to minimize plating and grit formation when it is in the precharge rather than distributed with the balance of the monomers is greatly reduced, and this is helpful. In preferred practice, substantially all of the sulfonic acid salt is present in the aqueous precharge, and this allows the most effective use of sodium styrene sulfonate.

In the normal practice of this invention, copolymerization is carried out in the presence of an anionic surfactant in addition to the sulfonic acid salt. The preferred anionic surfactant is a sulfosuccinate surfactant, these being illustrated in the Example of preferred practice.

It is desired to point out that aqueous alkaline latex paints are usually buffered to provide a stable pH to prevent the conventionally used metal container in which the paint is sold from corroding. The pH must, therefore, be at 7.0 or higher, and normal practice in this invention is to add alkaline buffer material to maintain a pH of at least about 7.5, preferably from pH 8.0-9.5. On the other hand, aqueous compositions which require thickening need not be latex compositions and they need not have a pH in the specified range, so it is an advantage that the compositions of this invention are less sensitive to the pH of the composition which is being thickened.

The agents used to provide whatever pH is desired are not of prime importance in this invention, and the selection of alkaline agents where desired is well known in the art.

The textured aqueous emulsion paints which are of concern are conventional materials except for the thickeners of this invention. These textured paints are ordinary latex paints which have been thickened in such a fashion that the flow-out on drying is minimized. The thickeners of this invention are outstanding in that they provide excellent sag resistance and excellent resistance to flow out, and thus provide textured aqueous emulsion paints of superior quality.

The binder of the paints is thus the same as is normally present in ordinary latex paints, namely: the binder is normally based on a copolymer of monoethylenically unsaturated monomers which are balanced to provide a glass transition temperature below about 20° C., usually from −10° C. to +10° C. The preferred copolymers are copolymers of at least 55% vinyl acetate with enough acrylic acid or methacrylic acid esters (as with a $C_1$ to $C_8$ alkanol, like butanol) to provide the desired glass transition temperature. A typical copolymer contains about 85% vinyl acetate, with the balance consisting essentially of n-butyl acrylate. While acrylic copolymers are also well known, such as a copolymer of ethyl acrylate and methyl methacrylate in a weight ratio of 2:1, and while the invention is applicable to such copolymers, best results are obtained with paints formulated with the vinyl acetate copolymers described above. All of these aqueous emulsion copolymers are commonly formed to include small amounts, generally less than a total of 3% by weight, of copolymerized monoethylenically unsaturated monomers which promote adhesion, as is conventional in this industry.

The proportion of thickener which is used to thicken any particular aqueous composition will vary with the composition and the thickening objective. Generally speaking one can use from 0.1% to 10% by weight of thickener based on the total weight of the aqueous composition. In latex paints, it is convenient to measure the proportion of thickener in pounds thereof per 100 gallons of paint. On this basis it is preferred to use from 3 to 15 pounds of thickener, preferably from 4 to 10 pounds thereof per 100 gallons of paint.

Aqueous latex paints can also be classified by the gloss which they produce on drying, and while this invention is applicable to these paints regardless of the gloss to which they dry, the invention is of especial importance to semi-gloss paints because the texture of the surface is easy to see in coatings of that type.

The invention is illustrated in the examples and tables which follow in which all parts are by weight. In the tests reported below, the properties of anionic thickeners prepared in accordance with this invention are compared with the properties which can be obtained using a typical ethoxylated surfactant in accordance with U.S. Pat. No. 4,514,552. The aqueous emulsion copolymerization is a conventional free-radical polymerization and is illustrated in the example of typical practice presented hereinafter.

TABLE I

| | (properties in water) | | | | |
|---|---|---|---|---|---|
| | Parts by Weight | | | 1% Visc in Water at pH 9 | |
| Run | EA | MAA | Macromonomer | 10 RPM | 100 RPM |
| 1. | 30 | 35 | 35 | TMI NPEO-50 | 930 | 679 |
| 2. | 50 | 39.5 | 10 | TMI NPEO-50 | 78 | 86 |
| 3. | 50 | 39.5 | 10 | TMI NPEO-50 | 5100 | 1240 |
| 4. | 50 | 39.5 | 10 | TMI NPPO-30 | 2460 | 672 |
| 5. | 50 | 39.5 | 10 | TMI NPPO-60 | 3800 | 930 |
| 6. | 50 | 39.5 | 10 | MAh-NPPO-60 | 2900 | 862 |

In the above tabulation, EA identifies ethyl acrylate, MAA identifies methacrylic acid, NP identifies nonyl phenol and EO- and PO- identify the alkoxylating moiety (ethylene oxide or propylene oxide), the number which follows, e.g., 50, identifies the number of moles of alkoxylation per mole of the phenol, and RPM identifies revolutions per minute. Runs 1–5 are all urethane macromonomers made with m-TMI (TMI in the table). Run 6 uses an ester monomer with MAh which identifies maleic anhydride.

TABLE II

| | (properties in paint) | | |
|---|---|---|---|
| | | Viscosities | |
| Run | #/100 gal. | Brush Drag | Leveling | Sag |
| 1. | 5.38 | 1.83 | 735 | 18.5 |
| 2. | 10.71 | 2.46 | 1264 | 21.5 |
| 3. | 6.64 | 1.56 | 2362 | 27.5 |
| 4. | 8.98 | 0.94 | 12680 | 47.5 |
| 5. | 9.01 | 0.97 | 11629 | 55.0 |
| 6. | 9.12 | 0.98 | 10286 | 60.0 |

In the above tabulation, #/100 gal. identifies pounds of thickener required to thicken 100 gallons of paint to a Stormer viscosity in the range of 90–95 Krebs units. The brush drag and leveling viscosities are in poises and are obtained in standard fashion. The Sag is Leneta Sag and is also obtained in standard fashion.

Run 1 represents presently preferred practice for the preparation of an anionic thickener to adjust the rheology of conventional latex paints.

Run 2 follows run 1, except the proportion of monomers is modified to employ the proportions preferred herein rather than those which provide best results in the conventional situation. 0.5% sodium styrene sulfonate was added to the monomer mix to minimize grit and plating difficulties during the copolymerization. This same addition was made to all the remaining runs.

As can be seen from the data, runs 1 and 2 both provide a latex paint rheology which is appropriate for a conventional latex paint, albeit far less of the thickener in run 1 is needed to provide the needed thickening, as shown in Table II.

Run 3 is the same as run 2, except that the production of the emulsion copolymer was made using the standard copolymerization procedure set forth in the example rather than those found to be best for a different purpose in run 1. Again, the paint rheology provided is appropriate for a conventional latex paint. However, and while the thickener of run 3 was more efficient than the one obtained in run 2, it was not as effective in providing the best paint rheology.

Runs 1, 2 and 3 thus indicate what can be expected when the alkoxylation is with ethylene oxide, namely: rheology which is generally appropriate for a conventional latex paint.

Runs 4 and 5 were the same as run 3 (which uses a standard copolymerization procedure detailed hereinafter) except a polypropoxylated macromonomer which possesses no surfactant properties was used in place of a polyethoxylated hydrophobe having surfactant characteristics. But here the properties were very different. Most importantly, the brush drag viscosity was now much too low and the leveling viscosity was much too high to permit use in any ordinary latex paint. At the same time, the Leneta sag values were quite high. These are unexpected characteristics, and they are exactly what is needed to provide anti-settling capacity and the rheology needed for a textured paint.

Runs 3 and 5 provide an interesting comparison because the only difference between them is the use of 50 moles of alkoxylation in one and 60 moles of alkoxylation in the other, a minor matter of little consequence. On the other hand, the ethoxylated product of Run 3 provides a more efficient thickener which contributes the usually desired characteristics of greater brush drag viscosity in combination with moderate leveling viscosity and moderate Leneta sag resistance. In contrast, the propoxylated thickener of run 5 is much less efficient as a thickener, and it contributes much lower brush drag viscosity in combination with much higher leveling viscosity and much higher Leneta sag resistance. This combination of characteristics is poorly adapted to provide a normal latex paint, but excellently adapted to provide a textured paint.

Run 6 was the same as run 5 except the alkoxylated monomer was the carboxyl-functional monoester of a polypropoxylated hydrophobe and maleic anhydride. Again, the brush drag viscosity was too low and the leveling viscosity was much too high to permit use in any ordinary latex paint. At the same time, the Leneta sag value was even higher than it was in run 4. The high Leneta sag value indicates that the configuration deposited on a surface being painted will be largely retained as the paint dries to provide a configured coating.

From the standpoint of how much thickener was used, latex paints are usually formulated to possess a Stormer viscosity of about 92 to about 96 Krebs units. The paints tested herein were all in the range of 90-95 Krebs Units. The Stormer viscosity is measured in a Stormer Viscometer using a fixed shear rate at 77° F. and a variable weight to power a stirrer paddle at a predetermined rotational velocity in the paint. The weight needed for this purpose, in grams, is converted to Krebs units in standard manner.

The pH value of normally formulated paint is maintained in the range of about 7.5 to about 8.5, and all of the paints studied had a pH in the specified range.

Example A—Preparation of a Propoxylated Urethane Macromonomer

To a 500 ml glass reactor fitted with thermometer, heating mantle, thermoregulator, stirrer, sparge tube and condenser were charged 250.0 grams of a 100% active 60 mole propoxylate of nonyl phenol. The reactor was then heated to 85° C., a light dry air sparge was started, and 0.0027 grams of methoxyhydroquinone (MEHQ) inhibitor was charged. 15 minutes later, 0.075 grams of dibutyltin dilaurate catalyst was charged and the dry air sparge was discontinued. 2 minutes later, 13.56 grams of alpha, alpha-dimethyl-m-isopropenyl benzyl isocyanate (m-TMI, a product of American Cyanamid Co.) were added to the reactor over a 3 minute period. The reactor contents were then heated at 80° C. for an additional 2.5 hours until complete consumption of isocyanate functionality was indicated. The reactor contents were then cooled to room temperature (25° C.) and a slightly cloudy light yellow liquid was obtained.

Example 3 of TABLE I was carried out as indicated below.

Example 3—Comparative Alkali-Soluble Thickener Example Containing an Ethoxylated Macromonomer To a 1.5 liter cylindrical glass reaction flask equipped with thermometer, stirrer, condenser, nitrogen inlet, thermoregulated water bath and monomer and initiator addition pumps was charged 658.5 grams of deionized water. The water was heated to 80° C. and purged with nitrogen for 30 minutes.

A monomer mix was prepared in a separate stirred container by charging 150.0 grams of ethyl acrylate, 118.5 grams of methacrylic acid, 33.3 grams of a 90% aqueous dispersion of an ethoxylated urethane macromonomer which was the reaction product of a 50 mole ethoxylate of nonyl phenol with m-TMI, 13.3 grams of 75% sodium dioctyl sulfosuccinate surfactant (American Cyanamide's 75% Aerosol OT was used), and 3.0 grams of deionized water.

In another vessel, a 1% initiator solution was prepared by charging 0.53 grams of sodium persulfate to 52.47 grams of deionized water.

Under a nitrogen blanket, 2.65 grams of 75% Aerosol OT surfactant were charged to the reactor followed by 1.88 grams of sodium styrene sulfonate, 31.5 grams (10%) of the previously prepared monomer mix, and 2.4 grams of a 10% aqueous solution of sodium persulfate. 20 minutes after charging, as above described, continuous additions of the remaining monomer mix (added over 2.5 hours) and the 1% initiator solution (added over 3 hours) were started. The reaction temperature was maintained at 80° C. until the continuous additions were complete and the reaction mixture was then heated for an additional 60 minutes at 80° C. The product was then cooled to room temperature (25° C.) and filtered. The final product was a homogenous latex with a solids content 30.1%, a viscosity of 23 cps, a density of 8.82 lbs/gal, and a pH of 3.03.

Example 5 of TABLE I was carried out as indicated below.

EXAMPLE 5—Alkali-Soluble Thickener Containing the Propoxylated Macromonomer of Example A This thickener was prepared using the same apparatus, conditions, and active monomer ratios used in comparative Example 3 except that a 100% active propoxylated macromonomer was used in place of the ethoxylated urethane macromonomer used in Example 3.

After charging 658.5 grams of deionized water to the reactor and heating it to 80° C., a monomer mix was prepared in a separate stirred container by charging 150.0 grams of ethyl acrylate, 118.5 grams of methacrylic acid, 30.0 grams of the 100% active propoxylated urethane macromonomer prepared in Example A, 13.3 grams of 75% Aerosol OT surfactant, and 3.3 grams of deionized water.

The remaining component amounts and polymerization procedure were exactly the same as those in Example 3. The final product was a homogeneous latex with a solids content of 29.8%, a viscosity of 23 cps, a density of 8.80 lbs/gal, and a pH of 2.67.

The properties of aqueous emulsion copolymers produced in the manner described above, but using different monomer proportions and different macromonomers and with sodium styrene sulfonate added to the monomer mix are shown in Table I hereinbefore. The properties of a typical latex paint containing these copolymers are shown in Table II hereinbefore. The latex paint tested was a semi-gloss paint in which the binder was a copolymer of 85% vinyl acetate and 15% n-butyl acrylate pigmented for semi-gloss appearance.

What is claimed is:

1. A copolymer which provides an aqueous alkali-soluble anionic copolymer providing anti-settling and thickening characteristics, comprising an aqueous emulsion copolymer of:
   (A) about 10–60 weight percent of an alpha, beta-monoethylenically unsaturated carboxylic acid;
   (B) about 20–80 weight percent of a non-reactive monoethylenically unsaturated monomer which provides a water-insoluble copolymer;
   (C) about 0.5–40 weight percent of a monoethylenically unsaturated, hydrophobic nonionic monomer which is the reaction product of a monohydric or monoamine-terminated polypropoxylated or polybutoxylated hydrophobe with a monoethylenically unsaturated monomer having a single group which is reactive under the conditions employed, and provided said monoethylenically unsaturated, hydrophobic nonionic monomer is not the reaction product of a monohydric or monoamine-terminated polyethoxylated hydrophobe with a monoethylenically unsaturated monomer having a single group which is reactive under the conditions employed; and
   (D) from 0 up to about 2 weight percent of a polyethylenically unsaturated monomer.

2. An aqueous emulsion copolymer as recited in claim 1 in which said unsaturated carboxylic acid is methacrylic acid.

3. An aqueous emulsion copolymer as recited in claim 1 in which said non-reactive monoethylenically unsaturated monomer is ethyl acrylate.

4. An aqueous emulsion copolymer as recited in claim 1 in which said monoethylenically unsaturated, hydrophobic nonionic monomer is the reaction product of a monohydric poly-iso-propoxylated or poly-sec-butoxylated hydrophobe with an unsaturated monoisocyanate.

5. An aqueous emulsion copolymer as recited in claim 1 in which said monoethylenically unsaturated, hydrophobic nonionic monomer is the reaction product of a monohydric poly-iso-propoxylated or poly-sec-butoxylated hydrophobe with an unsaturated monoanhydride.

6. A copolymer which provides an alkali-soluble anionic copolymer providing anti-settling and anti-sag thickening characteristics, comprising an aqueous emulsion copolymer of:
   (A) about 20–50 weight percent of an alpha, beta-monoethylenically unsaturated carboxylic acid;
   (B) about 30–70 weight percent of a non-reactive monoethylenically unsaturated monomer which provides a water-soluble copolymer; and
   (C) about 5–30 weight percent of a monoethylenically unsaturated, hydrophobic nonionic monomer which is the reaction product of a monohydric poly-iso-propoxylated or poly-sec-butoxylated hydrophobe with a monoethylenically unsaturated monomer having a single group selected from anhydride and isocyanate which is reactive with said hydroxy group, and provided said monoethylenically unsaturated, hydrophobic nonionic monomer is not the reaction product of a monohydric polyethoxylated hydrophobe with a monoethylenically unsaturated monomer having a single group selected from anhydride and isocyanate which is reactive with said hydroxy group.

7. An aqueous emulsion copolymer as recited in claim 6 in which said copolymer also contains from 0.1 to 3 weight percent of sodium styrene sulfonate.

8. An aqueous emulsion copolymer as recited in claim 6 in which said monomers selected to provide a water insoluble copolymer are $C_1$ to $C_8$ alkyl esters of (meth)acrylic acid.

9. An aqueous emulsion copolymer as recited in claim 6 in which said copolymerization is carried out in the presence of an anionic surfactant.

10. An aqueous emulsion copolymer as recited in claim 1 in which said nonionic monomer is derived from a monohydric nonionic hydrophobe having the formula:

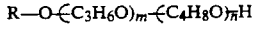

in which R is an alkyl group containing 1–22 carbon atoms or an alkaryl group containing 6–22 carbon atoms, n is a number having an average value of 0–150, and m is a number having an average value of 0–150 and n+m=6–150, preferably about 10–60.

11. A textured aqueous latex paint having a pH of at least about 7.5 thickened by a rheology-controlling effective amount of the aqueous emulsion copolymer product of claim 1.

12. A paint as recited in claim 10 in which said paint comprises a binder which is an aqueous emulsion copolymer of monoethylenically unsaturated monomers providing a glass transition temperature below about 20° C.

13. A paint as recited in claim 11 in which said glass transition temperature is from −10° C. to +10° C.

14. A paint as recited in claim 12 in which said binder comprises a copolymer of at least 55% vinyl acetate with enough acrylic acid or methacrylic acid esters to provide the desired glass transition temperature.

15. A paint as recited in claim 13 in which said binder is a copolymer of about 85% vinyl acetate, balance consisting essentially of n-butyl acrylate.

16. A copolymer which provides an aqueous alkali-soluble anionic copolymer providing anti-settling and thickening characteristics, comprising an aqueous emulsion copolymer of:
  (A) about 10-60 weight percent of an alpha, beta-monoethylenically unsaturated carboxylic acid;
  (B) about 20-80 weight percent of a non-reactive monoethylenically unsaturated monomer which provides a water-insoluble copolymer;
  (C) about 0.5-40 weight percent of a monoethylenically unsaturated, hydrophobic nonionic monomer which is the reaction product of a monohydric-terminated polypropoxylated or polybutoxylated hydrophobe with a monoethylenically unsaturated monomer having a single group which is reactive under the conditions employed, and provided said monoethylenically unsaturated, hydrophobic nonionic monomer is not the reaction product of a monohydric-terminated polyethoxylated hydrophobe with a monoethylenically unsaturated monomer having a single group which is reactive under the conditions employed, said hydrophobe having the formula:

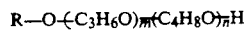

in which R is an alkyl group containing 1-22 carbon atoms or an alkaryl group containing 6-22 carbon atoms, n is a number having an average value of 0-150, m is a number having an average value of 0-150 and $n+m=6-150$; and
  (D) from 0 up to about 2 weight percent of a polyethylenically unsaturated monomer.

17. An aqueous emulsion copolymer as recited in claim 14 in which R is at least 1 and $m=10$ to 60, and $n=0$.

* * * * *